United States Patent
Shin et al.

(10) Patent No.: US 7,660,215 B2
(45) Date of Patent: Feb. 9, 2010

(54) METHOD AND APPARATUS FOR WRITING DATA TO OPTICAL DISC

(75) Inventors: Jung-mook Shin, Seoul (KR); Myung-su Han, Suwon-si (KR); Kil-soo Choi, Gwangmyeong-si (KR); Won-ju Shin, Suwon-si (KR); Sae-joong Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 784 days.

(21) Appl. No.: 10/969,026

(22) Filed: Oct. 21, 2004

(65) Prior Publication Data

US 2005/0190672 A1  Sep. 1, 2005

(30) Foreign Application Priority Data

Feb. 26, 2004  (KR) .................. 10-2004-0013011

(51) Int. Cl.
*G11B 7/00* (2006.01)

(52) U.S. Cl. ............ 369/47.28; 369/47.38; 369/47.46; 369/47.5; 369/47.3; 369/53.3; 369/116

(58) Field of Classification Search ............. 369/47.28, 369/47.46, 47.3, 47.38, 47.5, 116, 53.3
See application file for complete search history.

(56) References Cited

U.S. PATENT DOCUMENTS

| | | | |
|---|---|---|---|
| 5,351,226 A * | 9/1994 | Mizumoto et al. ....... | 369/47.39 |
| 5,721,856 A * | 2/1998 | Takeuchi ................ | 711/1 |
| 6,249,499 B1 * | 6/2001 | Andoh .................. | 369/53.22 |
| 6,577,570 B2 * | 6/2003 | Lee et al. .............. | 369/47.53 |
| 6,912,188 B2 * | 6/2005 | Morishima ............. | 369/47.53 |
| 6,944,106 B2 * | 9/2005 | Suzuki ................. | 369/47.53 |
| 7,088,667 B2 * | 8/2006 | Kobayashi ............. | 369/275.3 |
| 7,154,829 B1 * | 12/2006 | Roh .................... | 369/47.55 |
| 2002/0114234 A1 * | 8/2002 | Chao et al. ............ | 369/47.52 |
| 2003/0063544 A1 * | 4/2003 | Matsumoto ............. | 369/59.14 |
| 2003/0086346 A1 * | 5/2003 | Fukumoto ............... | 369/47.53 |
| 2004/0001412 A1 * | 1/2004 | Hsieh ................... | 369/59.11 |
| 2004/0017751 A1 * | 1/2004 | Matsumoto ............. | 369/47.53 |
| 2005/0083811 A1 * | 4/2005 | Halloush et al. ........ | 369/47.51 |
| 2005/0128908 A1 * | 6/2005 | Shin et al. ............. | 369/47.38 |

FOREIGN PATENT DOCUMENTS

JP  2002-123941  4/2002

(Continued)

*Primary Examiner*—Wayne R Young
*Assistant Examiner*—Linh T Nguyen
(74) *Attorney, Agent, or Firm*—Staas & Halsey LLP

(57) ABSTRACT

A method and apparatus for writing data to a rewritable ultra-speed disc using an optimum pulse at a write speed of the disc, based on Absolute Time in Pre-groove (ATIP) information. The method includes: reading a disc code from the disc; determining a write speed of the disc from the read disc code; and writing data to the disc. The writing is at the determined write speed and according to a write strategy when the write strategy for the lead-in area is determined to be present, and is according on a default write strategy when the write strategy for the lead-in area is determined not to be present.

13 Claims, 4 Drawing Sheets

FOREIGN PATENT DOCUMENTS

| | | |
|---|---|---|
| KR | P1998-59940 | 10/1998 |
| KR | 10-2001-0068498 | 7/2001 |
| KR | 010068381 A | 7/2001 |
| KR | 20010107333 A | 12/2001 |
| KR | 1020030069706 A | 8/2003 |
| KR | 1020030073241 A | 9/2003 |

* cited by examiner

FIG. 2

| MINUTES | SECONDS | FRAMES |
|---|---|---|
| M1 x x x x | S1 x x x x x | F1 x x x x x |

M1, S1, F1 = 000 : TIME CODES FOR PROGRAM AREA AND LEAD-OUT AREA

100 : TIME CODES FOR PCA, PMA, AND LEAD-IN AREA

101 : SPECIAL INFORMATION 1

110 : SPECIAL INFORMATION 2

111 : SPECIAL INFORMATION 3

001 : ADDITIONAL INFORMATION 1

010 : ADDITIONAL INFORMATION 2 (PRESERVED)

011 : ADDITIONAL INFORMATION 3 (PRESERVED)

METHOD AND APPARATUS FOR WRITING DATA TO OPTICAL DISC

CROSS-REFERENCE TO RELATED APPLICATION

This application claims the priority of Korean Patent Application No. 2004-13011, filed on Feb. 26, 2004, in the Korean Intellectual Property Office, the disclosure of which is incorporated herein by reference.

BACKGROUND OF THE INVENTION

1. Field of the Invention

The present invention relates to a method and apparatus for writing data to an optical disc, and more particularly, to a method and apparatus for writing data to a rewritable ultra-speed disc using an optimum pulse based on information regarding Absolute Time In Pre-groove (ATIP) and write speed of the disc.

2. Description of Related Art

In general, rewritable ultra-speed discs are largely categorized into 24× discs and 32× discs. When writing data to a rewritable ultra-speed disc, laser write power must be adjusted in consideration of the recording sensitivity of a disc layer and a change in the recording sensitivity caused by a change in a laser wavelength. Setting or readjustment of write power to write data to a disc is referred to as Optimum Power Control (OPC). An optical disc drive first determines a write strategy to set OPC for an optical disc. In particular, data is written to a rewritable ultra-speed disc using a write strategy for the same Absolute Time In Pre-groove (ATIP). In general, data is generally written to a disc whose optimum write power is not set based on either a default write strategy determined at a write speed of 24× or 32×, or a write strategy made based on ATIP for another disc manufactured by a manufacturer of the disc. However, in general, when a 24× disc and a 32× disc have the same ATIP or their lead-in areas have the same ATIP, data is indiscriminately written to these discs. That is, conventionally, data is recorded on a disc without determining whether the write speed of the disc is 24× or 32×, and thus, the data may be recorded according to a write strategy that does not match the write speed. Further, the data is written to the disc at a write speed determined by the write strategy rather than its write speed, thereby lowering the quality of the data recorded.

BRIEF SUMMARY

An embodiment of the present invention provides a method of writing data to a rewritable ultra-speed disc at an optimum write speed and according to write pulse, based on Absolute Time In Pre-groove (ATIP) information and information regarding the write speed.

An embodiment of the present invention also provides an optical disc recording apparatus adopting the method.

According to one aspect of the present invention, there is provided a method of writing data to a rewritable disc, including: reading a disc code from the disc; determining a write speed of the disc from the read disc code; and writing data to the disc. The writing is at the determined write speed and according to a write strategy when the write strategy for the lead-in area is determined to be present, and is according on a default write strategy when the write strategy for the lead-in area is determined not to be present.

According to another aspect of the present invention, there is provided an apparatus for recording data on a rewritable disc, including: an optical pickup which writes a signal to the disc and detects information regarding absolute time in pre-groove (ATIP) as a radio frequency signal from a recording surface of the rewritable disc; and a microcomputer which determines a write speed of the disc based on the information regarding the ATIP, and which writes the data to the disc. The microcomputer writes the data at the determined write speed according to a write strategy for a lead-in area of the disc when the write strategy for a lead-in area is present, and writes the data to the disc at the write speed according to a default write strategy when the write strategy for the lead-in area is not present.

According to another aspect of the present invention, there is provided a rewritable ultra-speed disc, including: a program area; a program memory area (PMA) which temporarily stores information regarding locations and types of information recorded on the program area; a power calibration area (PCA) which includes a test area in which Eight-to-Fourteen Modulation (EFM) data is recorded using Optimum Power Control (OPC) for testing and a count area in which information regarding available portions of the test area is recorded; a lead-in area, and a lead-out area. Information regarding the type, size, and structure of a disc, a channel bit length, and write power are recorded using Absolute Time In Pre-groove (ATIP) information.

According to another aspect of the present invention, there is provided a method of writing data to a rewritable disc, including: reading a disc code from the disc; determining a write speed of the disc from the read disc code; determining whether a write strategy for a lead-in area of the disc and a lead-out area of the disc are present; writing data to the disc, when the write strategy for at least the lead-in area is determined to be present, based on the write strategy and the write speed; and writing data to the disc, when the write strategy for at least the lead-in area is determined not to be present, based on a default write strategy and the write speed.

According to another aspect of the present invention, there is provided a method of writing data to a rewritable ultra-speed disc at an optimum write speed, including: determining a write speed of the disc; reading Absolute Time In Pre-groove (ATIP) information from the disc determining an optimum write pulse based on the ATIP information; and writing the data based on the optimum write pulse based on ATIP information and the write speed.

According to another aspect of the present invention, there is provided a computer readable storage medium encoded with processing instructions for causing a processor to execute a method of writing data to a rewritable disc. The method includes: reading a disc code from the disc; determining a write speed of the disc from the read disc code; and writing data to the disc, the writing being at the determined write speed according to the write strategy when a write strategy for the lead-in area is determined to be present, and being based on a default write strategy when the write strategy for the lead-in area is determined not to be present.

According to another aspect of the present invention, there is provided a computer readable storage medium encoded with processing instructions for causing a processor to execute a method of writing data to a rewritable disc. The method includes: reading a disc code from the disc; determining a write speed of the disc from the read disc code; determining whether a write strategy for a lead-in area of the disc and a lead-out area of the disc are present; writing data to the disc, when the write strategy for at least the lead-in area is determined to be present, based on the write strategy and the write speed; and writing data to the disc, when the write strategy for at least the lead-in area is determined not to be present, based on a default write strategy and the write speed.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 2 illustrates a format of Absolute Time In Pre-groove (ATIP) information stored in a rewritable ultra-speed disc according to an embodiment of the present invention;

DETAILED DESCRIPTION OF EMBODIMENTS

Figure 1:
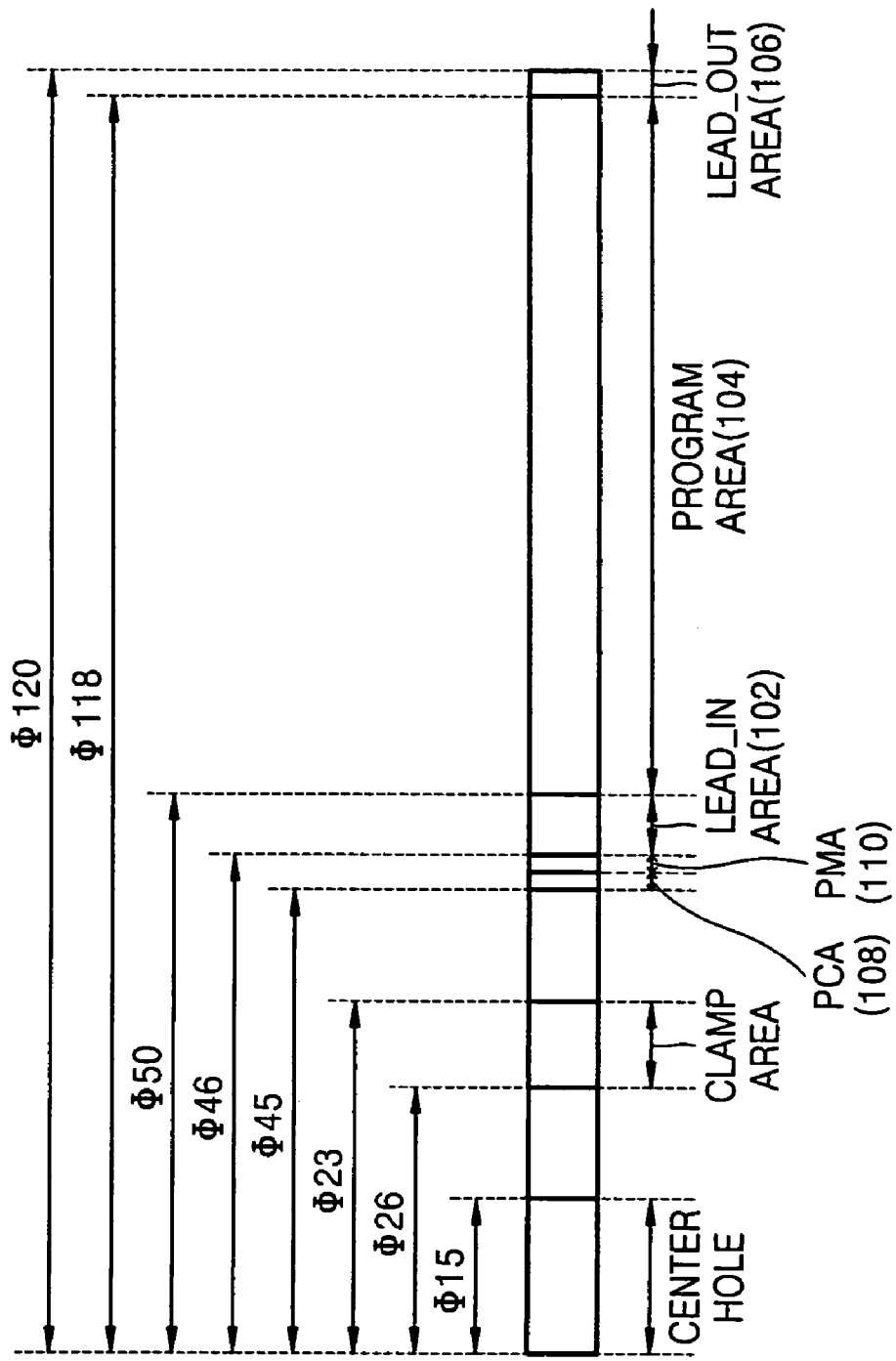
FIG. 1 is a schematic layout of a rewritable ultra-speed disc according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a schematic layout of a rewritable ultra-speed disc according to an embodiment of the present invention. The ultra-speed disc of FIG. 1 includes a Power Calibration Area (PCA) 108, a Program Memory Area (PMA) 110, a lead-in area 102, a program area 104, and a lead-out area 106. Here, the PCA 108 includes a test area in which Eight-to-Fourteen Modulation (EFM) data is recorded using Optimum Power Control (OPC) for testing, and a count area in which information regarding available portions of the test area is recorded. The PMA 110 temporarily stores information regarding locations and types of information recorded on the program area 104. In the lead-in area 102 and the lead-out area 106, information regarding the type, size, and structure of a disc, a channel bit length, and write power are recorded using Absolute Time In Pre-groove (ATIP) information.

FIG. 2 illustrates a format of ATIP information recorded on a rewritable ultra-speed disc according to an embodiment of the present invention. The ATIP information includes 8-bits of minutes, seconds, and frames. The type of ATIP information can be determined by a combination of Most Significant Bits (MSBs) M1, S1, and F1 of the minutes, seconds, and frames. For instance, when a combination of the MSBs M1, S1, and F1 is 101, the ATIP information represents special information 1 that specifies a write speed of the disc. When a combination of the MSBs M1, S1, and F1 is 000, the ATIP information represents time code for a program area and a lead-out area. When a combination of the MSBs M1, S1, and F1 is 100, the ATIP information represents time code for a PCA, a PMA, and a lead-in area.

A write strategy that is information required to write data to a rewritable ultra-speed disc is differently created according to an optical disc manufacturer. Thus, during manufacture of an optical disc recording apparatus, a manufacturer of the apparatus selects sample general optical discs classified by disc manufacturers; simulates writing and reading characteristics of the sample discs to obtain information regarding their writing characteristics, such as reference record power and write strategy; and stores the obtained information together with codes of the optical disc manufacturers in a memory. There are optical discs whose samples are not provided for the simulation since they are unknown discs or manufactured after manufacture of the apparatus. In this case, their physical characteristics are measured to obtain information regarding their writing characteristics and the respective obtained information are stored as defaults in the memory.

When an optical disc is loaded into an optical disc recording apparatus in which information regarding writing characteristics of optical discs classified by optical disc manufacturers and default writing characteristics information are stored in a table format in its memory, a microcomputer determines a manufacturer of the loaded optical disc from a start address information recorded as the ATIP information in a lead-in area/lead-out area. In other words, since a start time of a lead-in area/lead-out area is differently set according to an optical disc manufacturer, it is possible to easily perceive the optical disc manufacturer from the start address information.

If the loaded disc is manufactured by a disc manufacturer whose code has been stored in the memory, the microcomputer reads the writing characteristics information corresponding to the code for the disc manufacturer from the table in the memory and performs Optical Power Control (OPC) using the reference record power and write strategy included in the writing characteristics information.

Figure 3:
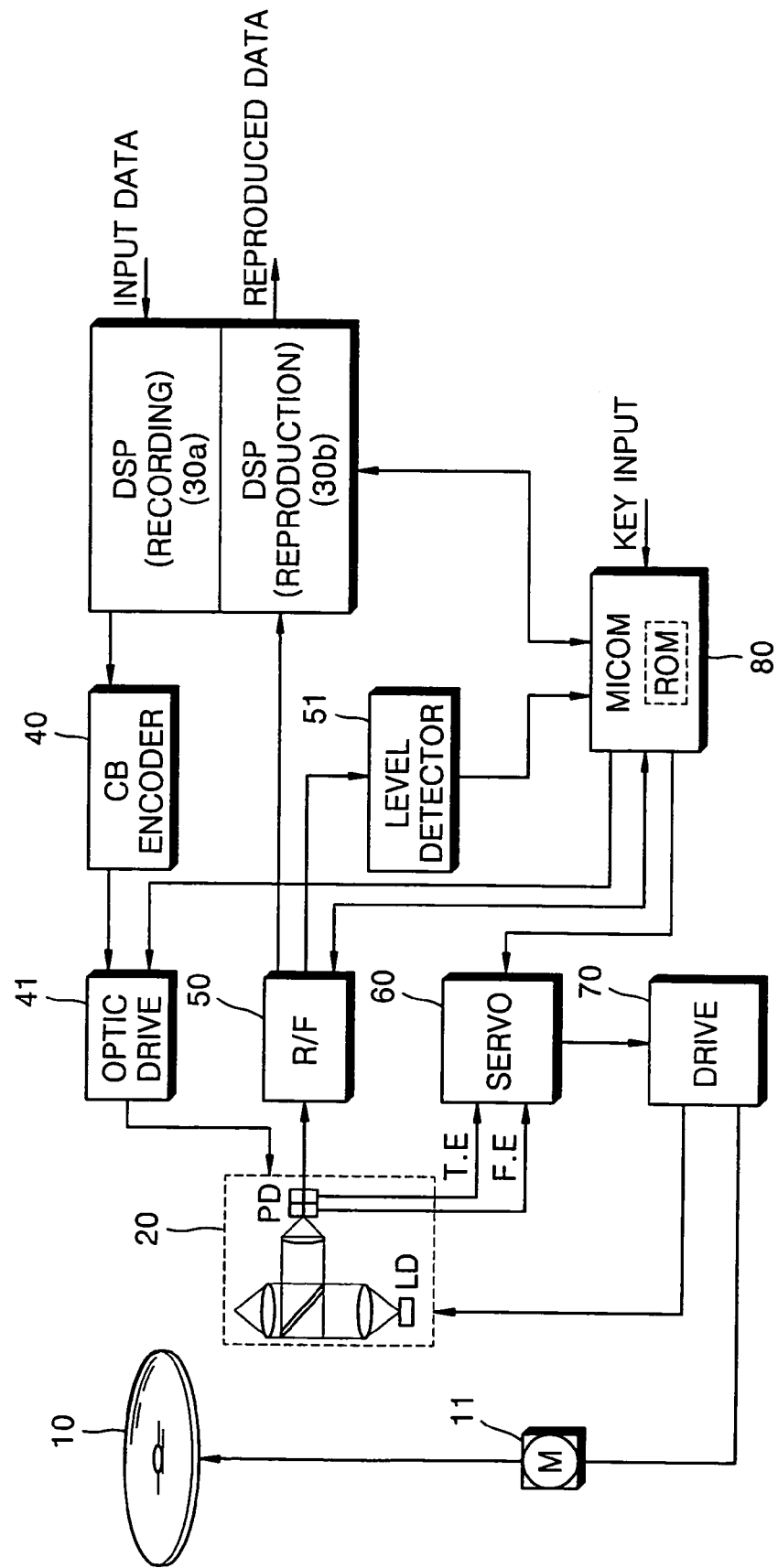
FIG. 3 is a block diagram of an apparatus for recording information on and reproducing information from a rewritable optical disc according to an embodiment of the present invention.

FIG. 3 is a block diagram of an apparatus for recording information on or reproducing information from a rewritable optical disc according to an embodiment of the present invention. Referring to FIG. 3, a Digital Signal Processor (DSP) 30a for recording converts the format of input digital data into a write format by adding Error Correcting Code (ECC) into the input digital data.

A channel bit encoder 40 converts the input digital data in the write format into bit streams.

An optical drive 41 outputs an optical drive signal in response to an input signal.

An optical pickup 20 writes the bit streams to the optical disc 10 and detects a write signal from a recording surface of the optical disc 10, in response to the optical drive signal.

A Radio Frequency (RF) processor 50 converts an RF signal input from the optical pickup 20 into a binary signal. A level detector 51 detects the level of the RF signal reflected from a recording surface of an optical disc 10.

A drive 70 drives a sled motor (not shown) that moves the optical pickup 20, and a spindle motor 11 that rotationally drives the optical disc 10.

A servo unit 60 controls driving of the drive 70 in response to a Tracking Error signal TE and a Focus Error signal FE generated by the optical pickup 20.

A DSP 30b for reproduction restores the binary signal, which is input from the RF processor 50, to the original data in response to a phase synchronization clock.

A microcomputer 80 records information on the optical disc 10 using a write strategy regarding a lead-in area/lead-out area, stored in a ROM of the microcomputer 80. In other words, the microcomputer 80 determines the write speed of the optical disc 10 from disc code, and writes data to the optical disc 10 at the write speed according to the write strategy when the write strategy for the lead-in area is set. If the write strategy for the lead-in area is not present, the microcomputer 80 writes data to the optical disc 10 using a write strategy set as a default.

Figure 4:
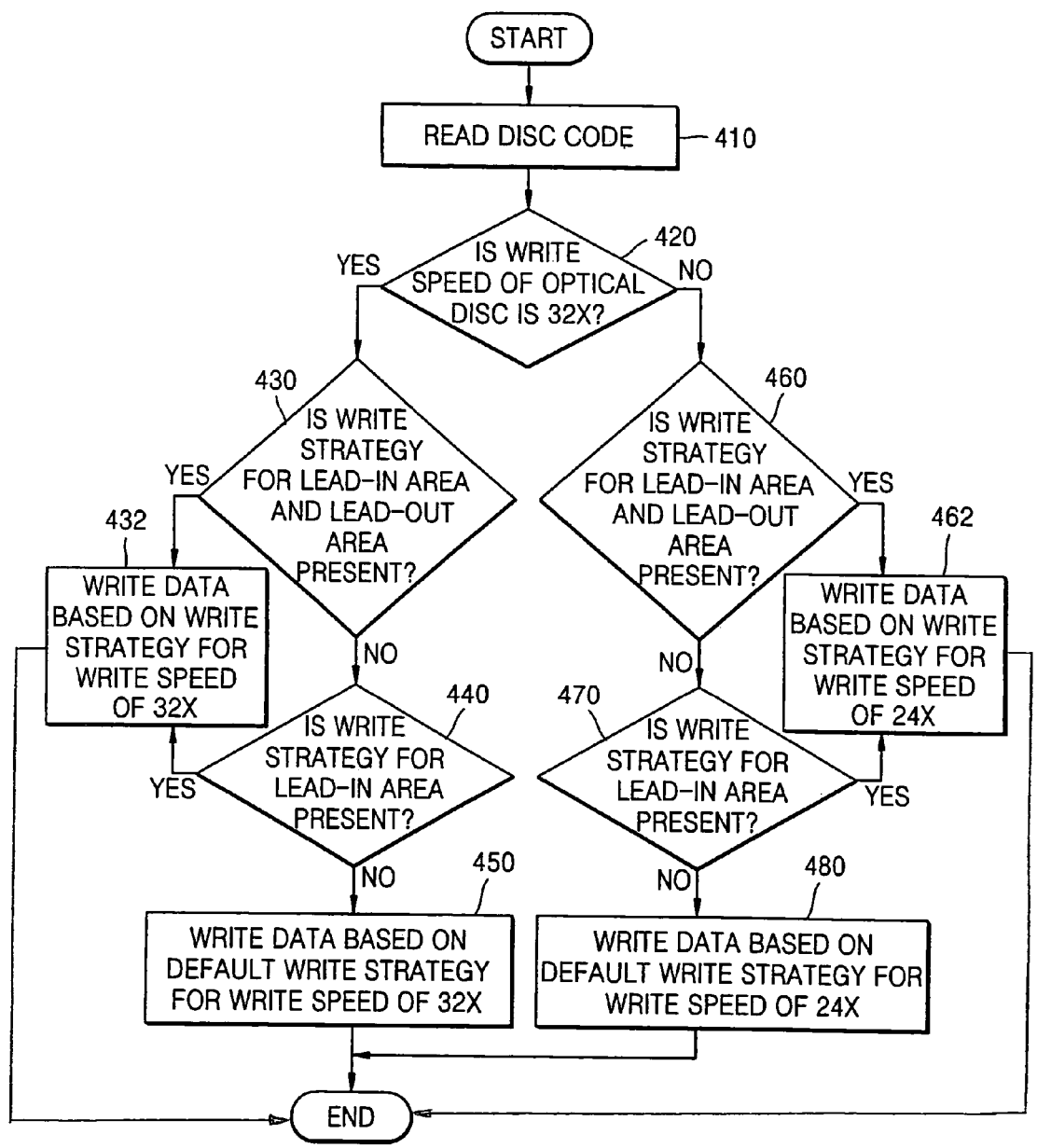
FIG. 4 is a flowchart illustrating a method of recording information on an optical disc according to an embodiment of the present invention.

FIG. 4 is a flowchart illustrating a method of recording information on an optical disc according to an embodiment of the present invention. Referring to FIGS. 3 and 4, a Read Only Memory (ROM) of the microcomputer 80 stores write strategies categorized by write speeds 24× and 32× of the optical disc 10 in a table format. When the microcomputer 80 reads disc code for special information 1 regarding a write speed of the optical disc 10 from the optical disc 10 and selects one of the write strategies according to the read write speed.

When the optical disc 10 is loaded into a disc deck (not shown), the microcomputer 80 extracts information regarding a lead-in area/lead-out area and the special information 1 regarding the write speed of the optical disc 10 from the disc code (operation 410).

Next, the microcomputer 80 determines whether the write speed of the optical disc 10 is 32× or 24× (operation 420). Then, the microcomputer 80 selects one of the tables for write strategies based on the determined write speed.

Next, the microcomputer 80 determines whether the write strategy regarding the lead-in area/lead-out area is present in the selected table (operation 430 if the write strategy is for 32× or operation 460 if the write strategy is for 24×).

If the write strategy regarding the lead-in area and the lead-out area is present in the selected table, the microcomputer 80 writes data to the optical disc 10 at a speed of 32× or 24× based on the write strategy (operation 432 if the write strategy is for 32× or operation 462 if the write strategy is for 24×). For instance, when the location of the lead-in area is read as "972421" from the optical disc 10, "972421", its corresponding write strategy must be included in the selected table.

Next, when the write strategy regarding both the lead-in area and the lead-out area is not included in the selected table, the microcomputer 80 determines whether a write strategy regarding only the lead-in area is included in the selected table (operation 440 if the write strategy is for 32× or operation 470 if the write strategy is for 24×). If the write strategy regarding the lead-in area is present, the microcomputer 80 writes data to the optical disc 10 at a speed of 32× or 24× based on the write strategy (operation 430 if the write strategy is for 32× or operation 460 if the write strategy is for 24×). In other words, if a write strategy regarding a 74-minute disc is included in a table but an 80-minute disc is loaded, the data is recorded on the 80-minute disc based on the write strategy regarding the 74-minute disc. Also, even if a write strategy regarding a lead-out area is not included in the table, data is recorded on the disc based on a write strategy regarding a lead-in area.

When it is determined that the write strategy for the lead-in area is not included in the table, the microcomputer 80 writes data to the optical disc 10 based on a default write strategy (operation 450 if the write strategy is for 32× or operation 480 if the write strategy is for 24×). If data is written to an unknown disc at a speed of 24× and 32×, the data will be satisfactorily written to a 16× recording area of the unknown disc but will not be satisfactorily written to a 24× or 32× recording area. Accordingly, a write speed of an optical disc is preferably limited to a maximum speed determined by OPC in order to prevent the quality of data written to the optical disc from being affected by a write speed of the optical disc.

Embodiments of the present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable recording medium can be distributed among computer systems that are interconnected through a network, and the present invention may be stored and implemented as a computer readable code in the distributed system.

As described above, according to the disclosed embodiments of the present invention, it is possible to write data to even a rewritable ultra-speed disc at an optimum write speed using an optimum write pulse based on ATIP information and its write speed.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of writing data to a rewritable disc, the method comprising:
    reading a disc code and information regarding a lead-in area and a lead-out area from the disc;
    extracting information regarding a write speed of the disc from the read disc code, and determining a write speed of the disc using the extracted information regarding the write speed of the disc;
    selecting a table from a plurality of tables for write strategies based on the determined write speed of the disc; and
    writing data to the disc, the writing being at the determined write speed and according to a first write strategy when a write strategy for a lead-in area and a lead-out area is determined to be present in the selected table, according to a second write strategy when a write strategy for the lead-in area is determined to be present in the selected table, and according to a default write strategy when the write strategy for the lead-in area is determined not to be present in the selected table.

2. The method of claim 1, further comprising determining, before the determining whether a write strategy for a lead-in area of the disc is present, whether a write strategy for a lead-in and a lead-out area are present and, when the write strategy is determined to be present, writing the data to the disc at the determined write speed according to the write strategy.

3. The method of claim 1, wherein when the write strategy for the read lead-in area is not set, the data is written to the disc at a write speed that is limited to a maximum write speed determined by optimum power control.

4. The method of claim 1, wherein the write strategy is categorized by a write speed of the disc.

5. The method of claim 1, wherein the reading includes reading information regarding a lead-in area and a lead-out area when the disc is loaded into a disc drive.

6. The method of claim 1, wherein the write strategy is one of 24× and 32×.

7. An apparatus for recording data on a rewritable disc, the apparatus comprising:
    an optical pickup which writes a signal to the disc and detects absolute time in pre-groove (ATIP) information as a radio frequency signal from a recording surface of the rewritable disc; and
    a microcomputer which reads a disc code and information regarding a lead-in area and a lead-out area from the disc, extracts information regarding a write speed of the disc from the read disc code, determines a write speed of the disc based on the ATIP information and the extracted information regarding the write speed of the disc, selects a table from a plurality of tables for write strategies based on the determined write speed of the disc and which writes the data to the disc, the microcomputer writing the data at the determined write speed according to a first write strategy when a write strategy for a lead-in area and a lead-out area is present in the selected table, according to a second write strategy when a write strategy for the lead-in area is determined to be present in the selected table, and according to a default write strategy when the write strategy for the lead-in area is not present in the selected table.

8. The apparatus of claim 7, wherein the rewritable disc comprises an ultra-speed disc.

9. The apparatus of claim 7, wherein the optical pickup writes and detects in response to an optical drive signal.

10. A method of writing data to a rewritable disc, the method comprising:

reading a disc code and information regarding a lead-in area and a lead-out area from the disc;

extracting information regarding a write speed of the disc from the read disc code, and determining a write speed of the disc using the extracted information regarding the write speed of the disc;

selecting a table from a plurality of tables for write strategies based on the determined write speed of the disc;

determining whether a first write strategy for a lead-in area of the disc and a lead-out area of the disc is present in the selected table;

determining whether a second write strategy for only the lead-in area of the disc is present in the selected table;

writing data to the disc at the determined write speed according to the first write strategy when the first write strategy is determined to be present in the selected table, and writing data to the disc at the determined write speed according to the second write strategy when the second write strategy is determined to be present in the selected table; and writing data to the disc, when the write strategy for the lead-in area is determined not to be present in the selected table, based on a default write strategy and the write speed.

11. A method of writing data to a rewritable ultra-speed disc at an optimum write speed, the method comprising:

reading a disc code and information regarding a lead-in area and a lead-out area from the disc;

extracting information regarding a write speed of the disc from the read disc code, and determining whether a write speed of the disc is one of a first and a second write speed using the extracted information regarding the write speed of the disc;

selecting a table from a plurality of tables for write strategies based on the determined write speed of the disc;

reading Absolute Time In Pre-groove (ATIP) information from the disc;

determining an optimum write pulse based on the ATIP information;

writing the data based on the optimum write pulse based on the ATIP information and using one of the first and second write speed according to a first write strategy when a write strategy for a lead-in area and a lead-out area is present in the selected table, writing the data based on the optimum write pulse based on the ATIP information and one of the first and second write speed according to a second write strategy for a lead-in area of the disc when a write strategy for the lead-in area is present in the selected table, and writing the data to the disc at one of the first and second write speed according to a default write strategy when the write strategy for the lead-in area is not present in the selected table.

12. A computer readable storage medium encoded with processing instructions to control at least one processing element in a computer to execute a method of writing data to a rewritable disc, the method comprising:

reading a disc code and information regarding a lead-in area and a lead-out area from the disc;

extracting information regarding a write speed of the disc from the read disc code, and determining a write speed of the disc using the extracted information regarding the write speed of the disc;

selecting a table from a plurality of tables for write strategies based on the determined write speed of the disc; and writing data to the disc, the writing being at the determined write speed according to a first write strategy when a write strategy for the lead-in area and the lead-out area is determined to be present in the selected table, according to a second write strategy when a write strategy for the lead-in area is determined to be present in the selected table, and according to a default write strategy when the write strategy for the lead-in area is determined not to be present in the selected table.

13. A computer readable storage medium encoded with processing instructions to control at least one processing element in a computer to execute a method of writing data to a rewritable disc, the method comprising:

reading a disc code and information regarding a lead-in area and a lead-out area from the disc;

extracting information regarding a write speed of the disc from the read disc code, and determining a write speed of the disc using the extracted information regarding the write speed of the disc;

selecting a table from a plurality of tables for write strategies based on the determined write speed of the disc;

determining whether a first write strategy for a lead-in area of the disc and a lead-out area of the disc is present in the selected table;

determining whether a second write strategy for only the lead-in area of the disc is present in the selected table;

writing data to the disc at the determined write speed according to the first write strategy when the first write strategy is determined to be present in the selected table, and writing data to the disc at the determined write speed according to the second write strategy when the second write strategy is determined to be present in the selected table; and writing data to the disc, when the write strategy for the lead-in area is determined not to be present in the selected table, based on a default write strategy and the write speed.

* * * * *